Oct. 19, 1948.  L. E. LA BRIE  2,451,562
AUTOMATIC ADJUSTER FOR FRICTION ELEMENTS
Filed June 8, 1946  2 Sheets-Sheet 1
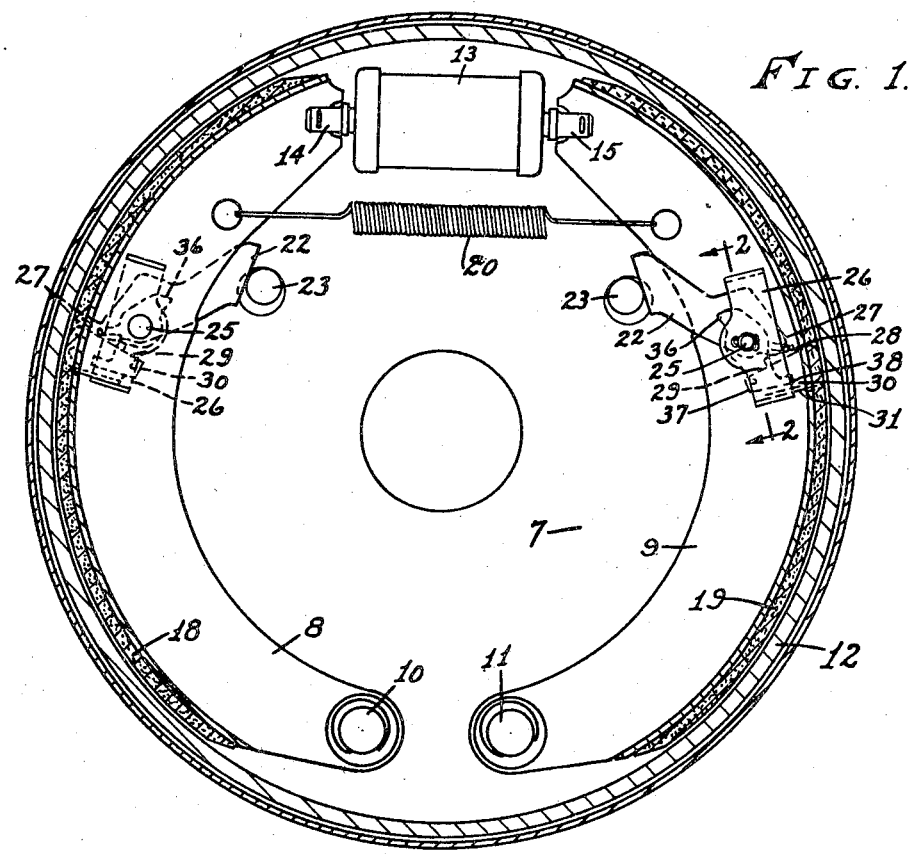
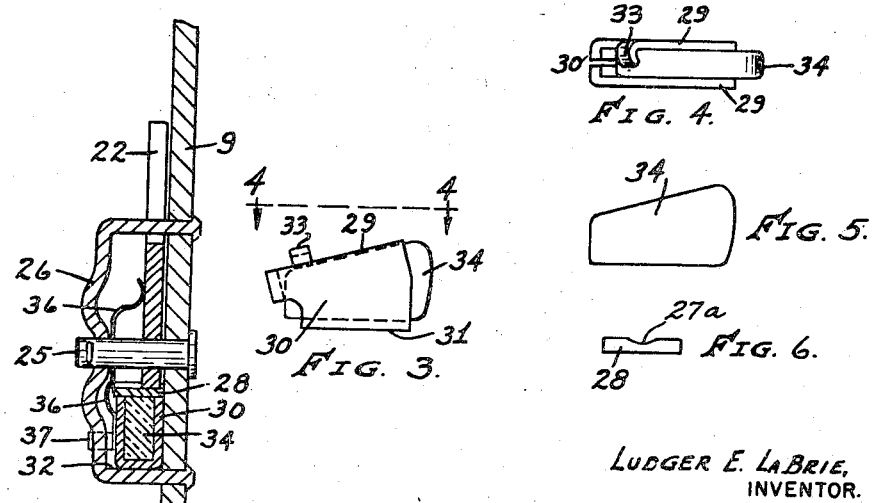
LUDGER E. LaBRIE,
INVENTOR.
BY Clifford C. Bradbury
ATTORNEY.

Oct. 19, 1948.  L. E. LA BRIE  2,451,562
AUTOMATIC ADJUSTER FOR FRICTION ELEMENTS
Filed June 8, 1946  2 Sheets-Sheet 2

Ludger E. LaBrie
Inventor

ATTORNEY

Patented Oct. 19, 1948

2,451,562

UNITED STATES PATENT OFFICE 2,451,562

AUTOMATIC ADJUSTER FOR FRICTION ELEMENTS

Ludger E. La Brie, Detroit, Mich., assignor to Hydraulic Brake Company, Detroit, Mich., a corporation of California Application June 8, 1946, Serial No. 675,417

1 Claim. (Cl. 188—79.5)

My invention relates to automatic adjusters for friction elements, and comprises means for extending the life and serviceability of automatic adjusters through improved mechanical constructions.

My invention is an improvement upon the structures of United States Patents 2,280,154, April 21, 1942, and 2,282,620, May 12, 1942.

In accordance with these patent disclosures, an auxiliary element of a material which does not wear away to any appreciable extent is extended through the wear lining of the friction element to the plane of its wear surface, and is adapted to be moved relative to the wear lining of the friction element as the wear lining wears away, the movement of the auxiliary element serving to determine the out-of-contact position of the wear element.

In accordance with my invention, the auxiliary element is preferably made of ceramic material, which is somewhat freely held within a metallic housing, the method of holding being such that expansion and contraction of the ceramic material due to heat of friction will not cause undue pressure between the housing and the ceramic material, whereby breakage from heat is avoided. In addition, the metallic housing takes the stresses due to relative distortion of the brake shoe and brake support during a braking operation and prevents these stresses from breaking the ceramic material.

In accordance with my invention, the entire housing for the ceramic material moves relative to the wear lining as the wear lining decreases in thickness, there being stop mechanism which is adjusted to its new positions in response to the movement of the housing for the auxiliary element.

Another feature of my invention is the provision of a pressure block which presents an extended flat surface to the auxiliary element housing, and a partially cylindrical bearing surface to the portion of the mechanism which serves as a stop, thus to minimize wear from the vibration which occurs when the automatic adjuster is applied to vehicle brakes.

My invention is illustrated in the accompanying drawing, in which

Fig. 1 is an elevation of an automobile backing plate, carrying brake shoes for movement into contact with a rotary brake drum.

Fig. 2 is a section through the arched shell forming part of the support for the movable parts of my invention taken on the line 2—2 of Fig. 1.

Fig. 3 is an elevation of the auxiliary element.

Fig. 4 is a view of the auxiliary element in the direction of the arrows 4—4 of Fig. 3.

Fig. 5 is an elevation of the ceramic material of the auxiliary element.

Fig. 6 is an elevation of the pressure block, and

Figure 7:
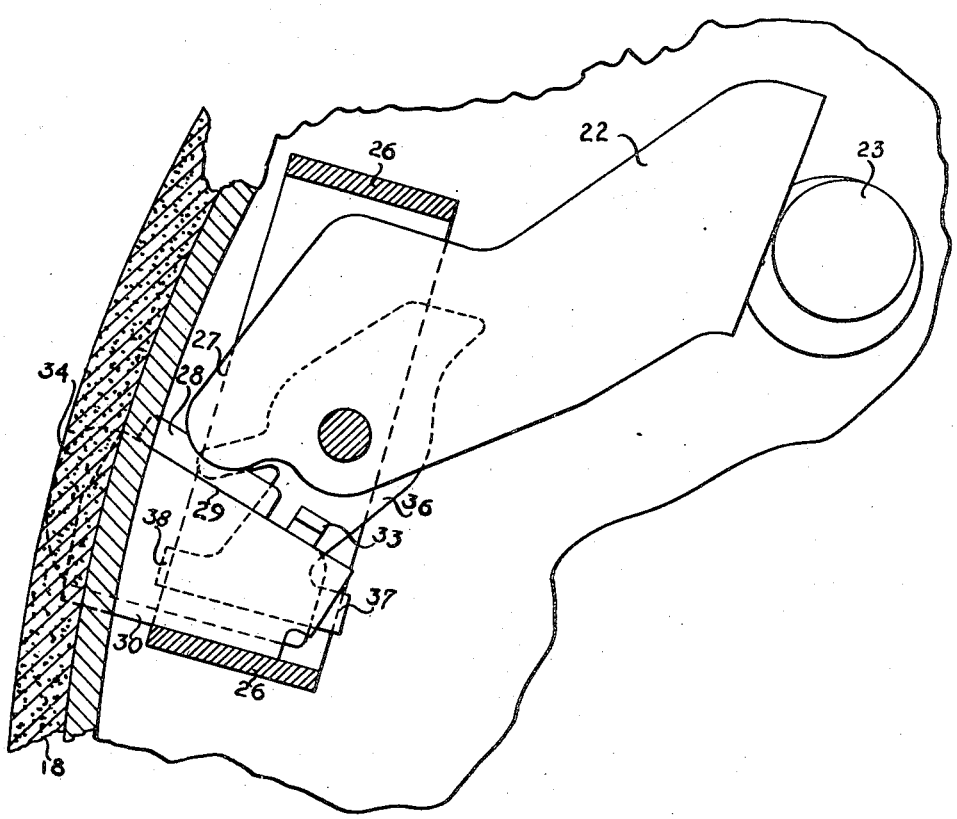
Fig. 7 is an enlargement of the operating mechanism with the cover portion of the seal 26 removed.

Referring to Fig. 1, a backing plate 7 has mounted thereon a pair of brake shoes 8 and 9, pivoted respectively at 10 and 11, and movable toward the brake drum 12 by any suitable means such as the hydraulic cylinder 13, secured to the backing plate 7, and the piston rods 14 and 15. The shoes 8 and 9 carry wear linings 18 and 19, which are normally held away from the drum 12 by a spring 20. The shoes 8 and 9, and the parts carried thereon, are identical and, therefore, interchangeable. For the purpose of this specification, only one of the two brake shoes, with its associated parts, will be described.

The distance which the lining 19 may be moved away from the drum 12 is limited by the contact of lever 22 against the manually adjustable stop 23. The lever 22 is fulcrumed upon a pin 25 which extends through the backing plate and the middle of the arched shell 26, which forms a partial housing for the automatic adjusting mechanism. The end of the lever 22, remote from the abutment 23, is provided with a cylindrical segment 27, which fits into a complementary cylindrical cavity 27a in the pressure plate 28 (see Figures 6 and 7). The pressure plate 28 abuts the smoothed and hardened edges 29 of the housing of the auxiliary element 30 as shown in Figs. 3, 4 and 7. The opposite edge 31 of the element 30 slides against the inner surface 32 of the arched shell 26 forming an abutment carried by the brake shoe for the edge 31 of the element 30. The faces 29 and 31 of the auxiliary element converge at an angle of about 20°, the larger end extending outwardly through a rectangular opening in the flange of the brake shoe 9, and the lining 19, the ceramic material 34, which forms a part of the element, extending slightly beyond the receptacle or housing of the element 30. The ceramic material 34 terminates flush with the outer surfaces of the wear lining 19 and is held in the housing of element 30 by a hook 33 formed integrally with one wall of the housing.

A leaf spring 36 is provided with an opening through which the pin 25 extends, and with ears 37 and 38 straddling the lever 22, which serve to hold the spring in position to bear upon the lever 22, the pressure plate 28 and the housing of the auxiliary element 30, with sufficient pressure to hold them in position against the vibration to which a vehicle axle is inevitably subjected.

The structure just described is such that when the auxiliary element is forced inwardly, the pressure plate 28 slides to a wider portion of the housing forming part of the auxiliary element 30, causing the lever 22 to rotate about the pin 25 in the direction toward the stop 23. The movement just described takes place due to wear of the lining 19, and since this occurs only when the brake shoe is in its friction producing position, the lever 22 is not at that time in contact with the stop 23, and, consequently, the only resistance which must be overcome in order to move the lever 22 is that provided by the spring 36 and the friction of the several parts against the backing plate due to the spring pressure, and the friction of the lever 22 on its pin 25. The resistance due to these frictions is small compared with the pressure produced by the contact of the rotating brake drum against the ceramic material of the auxiliary element.

Of course, the length of the two lever arms of lever 22 must be properly coordinated with the taper of the auxiliary element 30 in order that when the brake shoe returns to normal position, it will always stop with the same predetermined gap between the wear lining and the drum. The pressure of the ceramic material against the rotating drum will not be sufficient to cause appreciable wear of either the ceramic material or the drum. If it does wear, however, this wear can be compensated for by an adjustment of the manually adjustable stop 23. The pivot 11 is also manually adjustable by rotation so that upon the first installation of a brake shoe, or upon its relining, a proper gap may be established which thereafter will be automatically maintained.

The automatic adjustment mechanism just described is particularly applicable to hydraulic braking systems because the fluid in such systems automatically adjusts itself as to quantity in the wheel cylinders when the stop positions of the shoes are changed. However, it is to be understood that my invention is also applicable to mechanically operated brakes, and I, therefore, do not wish to be unduly limited to the precise structure illustrated and described.

I claim:

In a self-adjusting vehicle brake, a backing plate, a brake shoe pivoted on the backing plate and carrying a wear surface, a brake drum rotatable in proximity to the wear surface on said brake shoe, a stop carried by the backing plate, a pin extending perpendicular to the web of said brake shoe, a lever fulcrumed on said pin and having one end engaging said stop, a pressure plate journaled on another portion of said lever, an abutment carried by the brake shoe, the said abutment and pressure plate forming a wedge shaped receptacle with its wider part toward the wear surface on said shoe, an auxiliary element wedge shaped to conform to the said receptacle, the said auxiliary element comprising a metal housing having opposite surfaces for engaging said abutment and said pressure plate, and having a surface of ceramic material flush with the friction surface of said wear material, a leaf spring having three separately flexible portions, one engaging said lever, one engaging said pressure plate, and one engaging said auxiliary element, all pressing said members toward and into engagement with the web of said brake shoe, and a shell spanning the lever, the pressure plate and the auxiliary element, and forming an abutment for said leaf spring and a guide for said fulcrum.

LUDGER E. LA BRIE.

REFERENCES CITED

The following references are of record in the file of this patent:

UNITED STATES PATENTS

| Number | Name | Date |
|---|---|---|
| 2,222,836 | Goepfrich | Nov. 26, 1940 |
| 2,282,620 | Swift | May 12, 1942 |
| 2,380,795 | Schnell | July 31, 1945 |